(12) United States Patent
Harrison

(10) Patent No.: US 9,210,085 B2
(45) Date of Patent: Dec. 8, 2015

(54) PEER-TO-PEER STREAMING OF NON-LIVE CONTENT

(75) Inventor: David Harrison, San Francisco, CA (US)

(73) Assignee: BitTorrent, Inc., San Francisco, CA (US)

( * ) Notice: Subject to any disclaimer, the term of this patent is extended or adjusted under 35 U.S.C. 154(b) by 1071 days.

(21) Appl. No.: 11/868,464

(22) Filed: Oct. 5, 2007

(65) Prior Publication Data

US 2008/0140853 A1 Jun. 12, 2008

Related U.S. Application Data

(60) Provisional application No. 60/828,340, filed on Oct. 5, 2006, provisional application No. 60/954,535, filed on Aug. 7, 2007.

(51) Int. Cl.
*G06F 15/16* (2006.01)
*H04L 12/801* (2013.01)
*H04L 12/851* (2013.01)
*H04L 12/853* (2013.01)
(Continued)

(52) U.S. Cl.
CPC .............. *H04L 47/10* (2013.01); *H04L 47/193* (2013.01); *H04L 47/2408* (2013.01); *H04L 47/2416* (2013.01); *H04L 47/30* (2013.01); *H04L 65/4084* (2013.01); *H04L 67/104* (2013.01); *H04L 67/108* (2013.01); *H04L 67/1091* (2013.01)

(58) Field of Classification Search
CPC ... H04L 47/10; H04L 47/193; H04L 47/2408; H04L 47/2416; H04L 47/30; H04L 65/4084; H04L 67/104

USPC .......................................................... 709/231
See application file for complete search history.

(56) References Cited

U.S. PATENT DOCUMENTS

2002/0194108 A1* 12/2002 Kitze ............................... 705/37
2003/0126277 A1* 7/2003 Son et al. ...................... 709/231
(Continued)

OTHER PUBLICATIONS

BASS: BitTorrent Assisted Streaming System for Video-on-Demand, IEEE International Workshop on Multimedia Signal Processing (MMSP), Oct. 2005.*

(Continued)

*Primary Examiner* — Karen Tang
(74) *Attorney, Agent, or Firm* — Fenwick & West LLP

(57) ABSTRACT

A Peer-to-Peer protocol such as BitTorrent is used to assist streaming. Peers download streaming content from the P2P network while simultaneously playing the downloaded content. As the stream plays, an end system downloads any missing pieces directly from a server or other infrastructure node. This method roughly squares server capacity and can be refined to require on average O(1) servers regardless of the number of concurrent users. Thus BitTorrent assisted streaming scales better than traditional server-client and other infrastructure-only solutions, each of which requires a number of infrastructure nodes that scale linearly as a function of the number of users. Unlike End-System-Multicast, BitTorrent assisted streaming does not subject users to the vagaries of intermediate unreliable, potentially bandwidth-constrained end-systems; the departure of any single end-system has minimal impact on overall performance; and BitTorrent has a well-crafted incentive mechanism for encouraging users to contribute their upstream capacity.

35 Claims, 9 Drawing Sheets

(51) Int. Cl.
*H04L 12/835* (2013.01)
*H04L 29/06* (2006.01)
*H04L 29/08* (2006.01)

(56) References Cited

U.S. PATENT DOCUMENTS

| | | | |
|---|---|---|---|
| 2006/0053209 A1* | 3/2006 | Li | 709/217 |
| 2006/0184688 A1 | 8/2006 | Ganguly et al. | |
| 2007/0028133 A1 | 2/2007 | Izutsu et al. | |
| 2007/0245010 A1* | 10/2007 | Arn et al. | 709/223 |
| 2007/0294422 A1* | 12/2007 | Zuckerman et al. | 709/230 |
| 2008/0005114 A1* | 1/2008 | Li | 707/9 |
| 2009/0177792 A1* | 7/2009 | Guo et al. | 709/231 |

OTHER PUBLICATIONS

Skevik et al., Analysis of BitTorrent and its use for the Design of a P2P based Streaming Protocol for a Hybrid CDN, University of Oslo, Jun. 2004.*

Lee et al., Multi-source Media Streaming for the Contents Distribution in a P2P Network, Aizawa et al. (Eds.), PCM 2004, LNCS 3333, pp. 290-297, 2004.*

Chris Dana et al., *BASS:BitTorrent Assisted Streaming System for Video-on-Demand*, IEEE International Workshop on Multimedia Signal Processing (MMSP), Oct. 2005, 4 pages.

International Search Report and Written Opinion for PCT/US07/80648, Oct. 5, 2007, 8 pages.

* cited by examiner

1. Pieces are downloaded from the priority window earliest-eligible first. Ineligible pieces (those that have exceeded their safe times) are preempted and downloaded from the origin server.
2. When not downloading pieces earliest-eligible first from priority window, download rarest-eligible first from [t, T].

PEER-TO-PEER STREAMING OF NON-LIVE CONTENT

CROSS-REFERENCE TO RELATED APPLICATIONS

This application claims the benefit of U.S. Provisional Application Ser. Nos. 60/828,340 and 60/954,535, both of which are incorporated by reference herein in their entirety.

BACKGROUND OF THE INVENTION

1. Field of the Invention

The present invention relates generally to file transferring in a network. In particular, the present invention is directed to streaming of files in a peer-to-peer network.

2. Description of Background Art

Content providers typically either stream audio, video, or other content directly from a server farm or employ a content distribution network (CDN), such as Akamai. A CDN comprises a set of servers or application-layer routers sprinkled about the Internet, and can thus solve problems that are not addressed by a single server farm. When a portion of the network becomes congested or experiences a localized failure, a CDN can shift users between servers or route between different application-layer routers. When the network becomes partitioned, subsets of the topology that contain a working server typically continue operating.

Although CDNs address critical problems, CDNs like the traditional server-client model require substantial infrastructure. For example, Akamai operates tens of thousands of servers all over the world. The number of servers scales linearly with the number of concurrent users.

In the last few years, a new paradigm has arisen in which end-systems form a peer-to-peer (P2P) network. An end-system acting as a peer contributes its bandwidth and storage to aid in the distribution of content among the peers. This paradigm has no inherent bandwidth scaling limit since arriving peers add more capacity to the system. Two recent examples of this paradigm are BitTorrent and Avalanche.

To encourage peers to contribute their bandwidth resources, BitTorrent uses a tit-for-tat incentive mechanism in which each peer sends to those peers that send the most to it. So that peers have content that other peers want, BitTorrent divides the file into pieces and distributes the pieces in rarest-first order. Avalanche ensures that peers have information of interest by using network coding. In either case a file is not playable until the entire file has been received.

Conventional solutions to content distribution can be divided generally into one of four categories: infrastructure-only solutions, end system multicast, peer-to-peer file sharing, and peer-to-peer streaming.

Infrastructure-Only Solutions

The traditional server-client model divides nodes into servers 102 that provide the data, and clients 104 that consume it as shown in FIG. 1(a). A corporate network or Internet Service Providers (ISPs) may provide proxy caches to reduce latency and network load by storing content near users on their networks. A CDN may achieve similar goals by replicating content out to server farms that are sprinkled about the Internet topology as shown in FIG. 1(b). For live content, a CDN cannot replicate content ahead of time, but the CDN can create an application-layer multicast tree that spans the data centers and then each data center takes end-users as leaves as shown in FIG. 1(c).

However all of these strategies require infrastructure that grows linearly with the number of users. To see this, divide all nodes into either infrastructure nodes 202 or end-systems 204 as shown in FIG. 2. The infrastructure nodes include servers, proxy caches, and application-layer routers. Regardless of how the infrastructure nodes are arranged internally, in order to serve n concurrent users at a minimum bit rate $r_o$, the infrastructure must deliver n users worth of content at an aggregate rate of $nr_o$. Assuming each infrastructure node has fixed capacity, for large n, the number of infrastructure nodes must be at least linear in n, i.e., $\Omega(n)$.

Examples of the traditional server-client model include Real Networks' Helix server with the RealOne Player client, and Microsoft Windows Media Services with the Windows Media Player client. Examples of content distribution networks that may replicate content out to data centers before delivery include Akamai and Real Networks.

End-System Multicast

Alternatively, end-systems can arrange themselves into a tree as shown in FIG. 3(a) and forward content that they receive. This is conventionally known as end system multicast. However, no proposed end-system multicast scheme has a fully decentralized incentive mechanism. The importance of such incentive mechanisms is underscored in two studies of peer-to-peer file sharing systems that lack incentive mechanisms: for gnutella as high as 70% of the peers share zero or no files, and Napster at the height of its popularity had 20%-40% of its peers sharing few or no files.

End-system multicast is an example of the Peer-to-Peer (P2P) paradigm. With P2P, peers forward content to each other. Thus P2P networks leverage the peers' otherwise unused upstream bandwidth to add capacity to the system. For media encoded at a bit rate less than the peers' upstream capacity, each peer adds more system capacity than it consumes. In theory, a single peer or server could then serve any number of end-systems. However, to route content through an end-system requires passing the content through a potentially congested and lossy access network to forward through a node that may depart at any time. Thus, quality, rather than capacity, limits scale.

A peer exhibits peer reliance when it relies on one or more peers to provide content, but either does not allow enough time or by design is disallowed from contacting a reliable infrastructure node such as a server to provide missing or damaged content should the peers fail. The most basic form of ESM exhibits peer reliance. FIG. 3(b) omits the network cloud and shows the end-systems arranged in a tree rooted at an infrastructure node. The server has capacity C, each end-system has capacity C, and the content passes through a maximum of k end-system hops to reach the end-systems. Even if the peers use a reliable transport protocol such as TCP to retransmit lost packets at each peer-to-peer hop, a peer may still depart unexpectedly, requiring its children to spend seconds, perhaps tens of seconds, to disambiguate a burst loss from the departure of a parent and to then repair the tree. Of even more concern is that the departure of a single end-system near the root of the tree can result in a disruption for a significant fraction of the entire audience. Assuming that each node has probability of unexpectedly departing p within any given time interval, then the probability of an unexpected departure occurring in that interval is $1-(1-p)^k$ where k is the number of intermediate hops to the source. At some depth the frequency of departures results in intolerable performance. Similar arguments can be made for packet loss. As shown in FIG. 3(c), this means that ESM also requires O(n) infrastructure when playback quality is taken into account.

There are multiple ways of improving the robustness of ESM to packet loss and to unexpected end-system departures, each with trade-offs. For example, Splitstream and CoopNet construct multiple interior node-disjoint multicast trees spanning the receivers, i.e., a node is an interior node on only one tree and is a leaf on all of the other trees. As a result, if a node fails at most one tree is disrupted. All receivers still receive the remaining content, and if the media (audio, video) is encoded using Multiple Description Coding (MDC) the media is playable, albeit with some degradation in quality.

Unfortunately MDC has high overhead, especially for video. It is difficult to make each description independently decodable without including a significant amount of redundant information, e.g., redundant motion vectors can consume 20% of the encoded bit rate. Furthermore, even though MDC increases robustness to packet loss, this merely increases the allowable depth of the tree, and thus does not change ESM from requiring O(n) infrastructure.

Peer-to-Peer File Sharing

BitTorrent contains one key contribution missing from prior peer-to-peer file sharing systems and proposed ESM systems: BitTorrent includes a decentralized incentive mechanism to encourage peers to share their upstream bandwidth. Using BitTorrent, the shared file is broken into pieces. Each peer opens connections with a set of peers desiring the same file, and each tells the others what pieces they have. Each peer then swaps pieces until it has a complete file. Upon obtaining the complete file, a peer that continues sharing is called a seed. To encourage peers to share their upstream capacity, BitTorrent peers engage in a rate-based tit-for-tat: each peer sends to the four peers that send the fastest to it. To allow peers to compete for those top four spots, each peer randomly admits one additional peer every thirty seconds and stops sending to the slowest.

FIG. 4 illustrates a BitTorrent peer-to-peer network, comprised of two kinds of end-systems: downloaders 402 and seeds 404. Seeds have a complete copy of the file desired by the downloaders. The downloaders download from the seeds and trade the downloaded pieces with other downloaders.

Peer-to-Peer Streaming

End-system multicast is an example of peer-to-peer streaming Recently CoolStreaming introduced the notion of a data-driven overlay network for live media streaming. The data-driven overlay arranges peers into a graph. The availability of needed data determines the direction data flows through the graph. CoolStreaming has been demonstrated delivering live TV-quality streaming (450 Kbps). However, CoolStreaming provides no incentive mechanisms for users to contribute their upstream bandwidth.

SwarmStreaming is a product offered by Onion Networks Inc., of Minneapolis, Minn., which breaks media files into pieces and distributes the pieces across a peer-to-peer network. These pieces are then delivered between peers sufficiently in-order to allow playback before the entire file has been downloaded. However, SwarmStreaming does not provide incentives for users to provide their upstream capacity.

BitTorrent Assisted Streaming System (BASS) is not quite peer-to-peer streaming, but rather employs a hybrid P2P/server-client model that scales better than the traditional server-client model and avoids peer reliance, thus providing a similar user experience to the traditional server-client model. BASS is further described in Chris Dana, Danjue Li, David Harrison, and Chen-Nee Chuah, "Bass: Bittorrent assisted streaming system for video-on-demand," in *IEEE International Workshop on Media Signal Processing* 2005, October 2005, incorporated by reference herein.

To enable a peer to begin playing before it has received the entire file, BASS introduces a server 502 or other infrastructure node that provides any piece that a peer could not download from BitTorrent in time for playback, as illustrated in FIG. 5. BitTorrent is not modified except that BASS will not download missing pieces for an already played portion of the file. Thus BASS downloads pieces in rarest first order from the interval [t, T] where t is the user's current playback time and T is the duration of the file.

SUMMARY OF THE INVENTION

The present invention enables methods for employing a peer-to-peer network such as BitTorrent to assist streaming. According to a method of the present invention, users download streams from BitTorrent while simultaneously playing the stream being downloaded. As the stream plays, the end-system downloads any missing pieces directly from a server or other infrastructure node. This offers a middle ground between pure End-System Multicast (ESM) and pure infrastructure solutions. This enables the use of on average O(1) servers, regardless of the number of concurrent users. Thus BitTorrent assisted streaming scales better than traditional server-client and other infrastructure-only solutions, each of which requires a number of infrastructure nodes that scales linearly as a function of the number of users. Unlike ESM, BitTorrent assisted streaming does not subject users to the vagaries of intermediate unreliable, potentially bandwidth-constrained end-systems; the departure of any single end-system has minimal impact on overall performance; and BitTorrent has a well-crafted incentive mechanism for encouraging users to contribute their upstream capacity.

BRIEF DESCRIPTION OF THE DRAWINGS

FIG. 7(*b*) illustrates the uniform distribution across an unviewed portion of a file of bits arriving from the peer-to-peer network in accordance with an embodiment of the present invention.

DETAILED DESCRIPTION OF THE PREFERRED EMBODIMENTS

Figure 1:
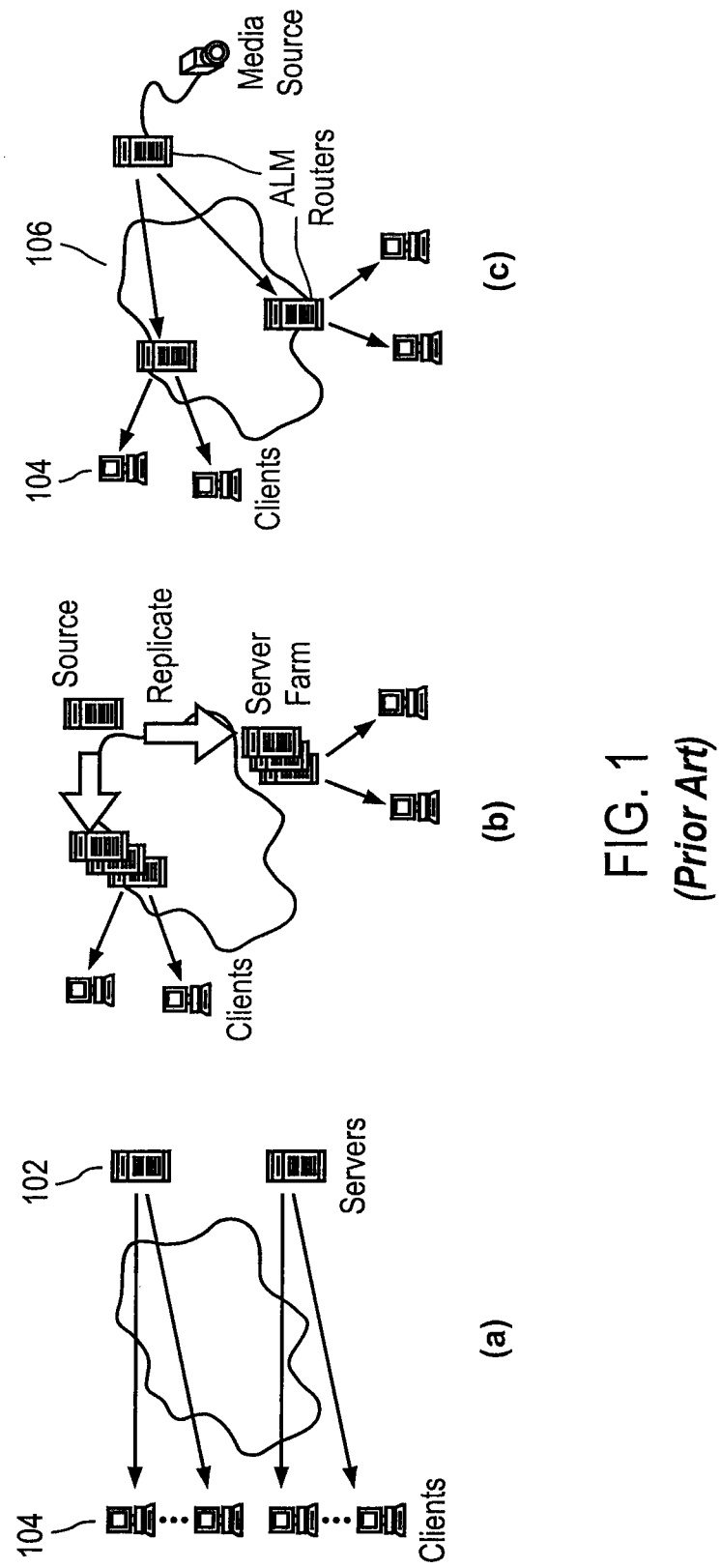
FIG. 1 illustrates traditional infrastructure-only solutions to file transfers.
Figure 2:
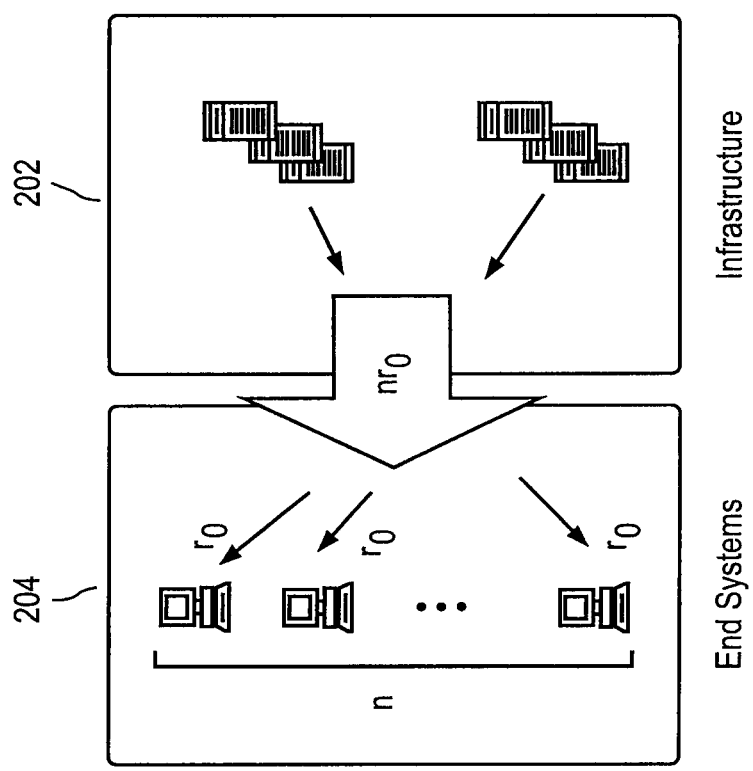
FIG. 2 illustrates a division of nodes into infrastructure nodes and end-systems.
Figure 3:
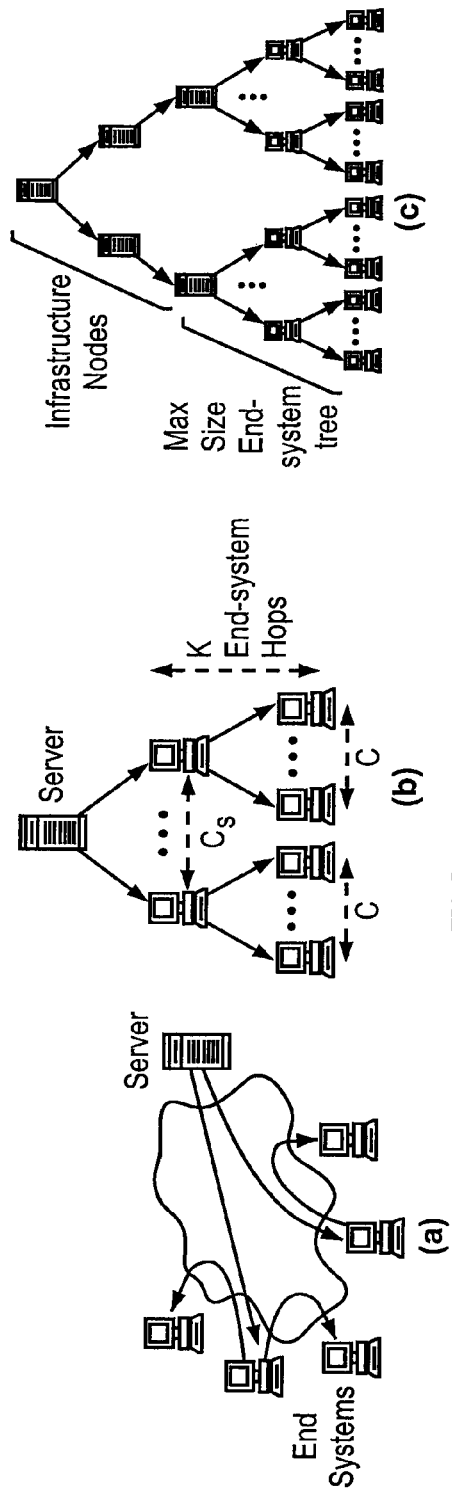
FIG. 3 illustrates the use of end-system multicast.
Figure 4:
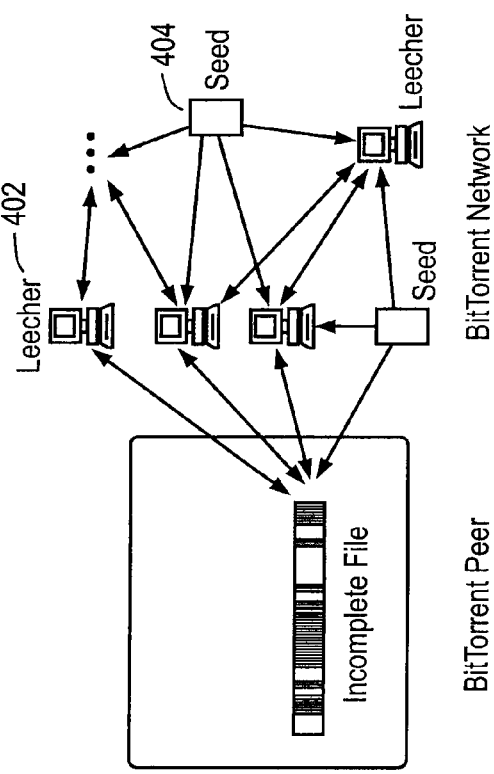
FIG. 4 illustrates a BitTorrent peer-to-peer network.
Figure 5:
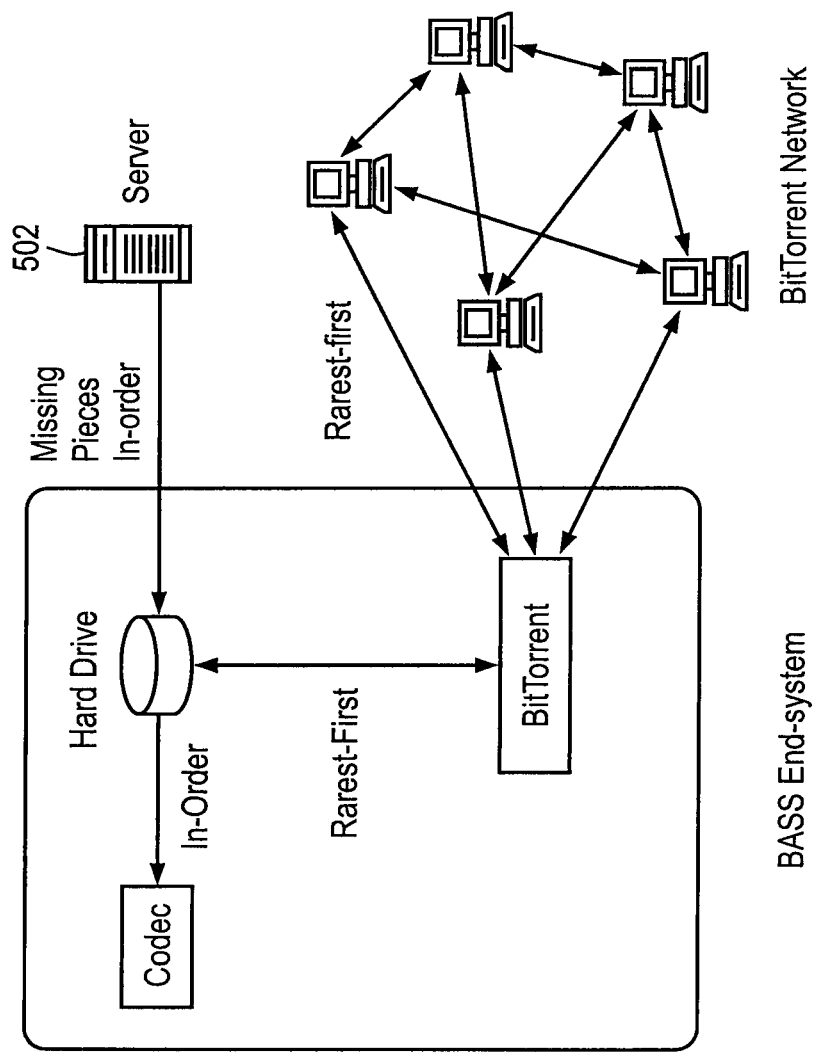
FIG. 5 illustrates the use of a BitTorrent Assisted Streaming System.
Figure 6:
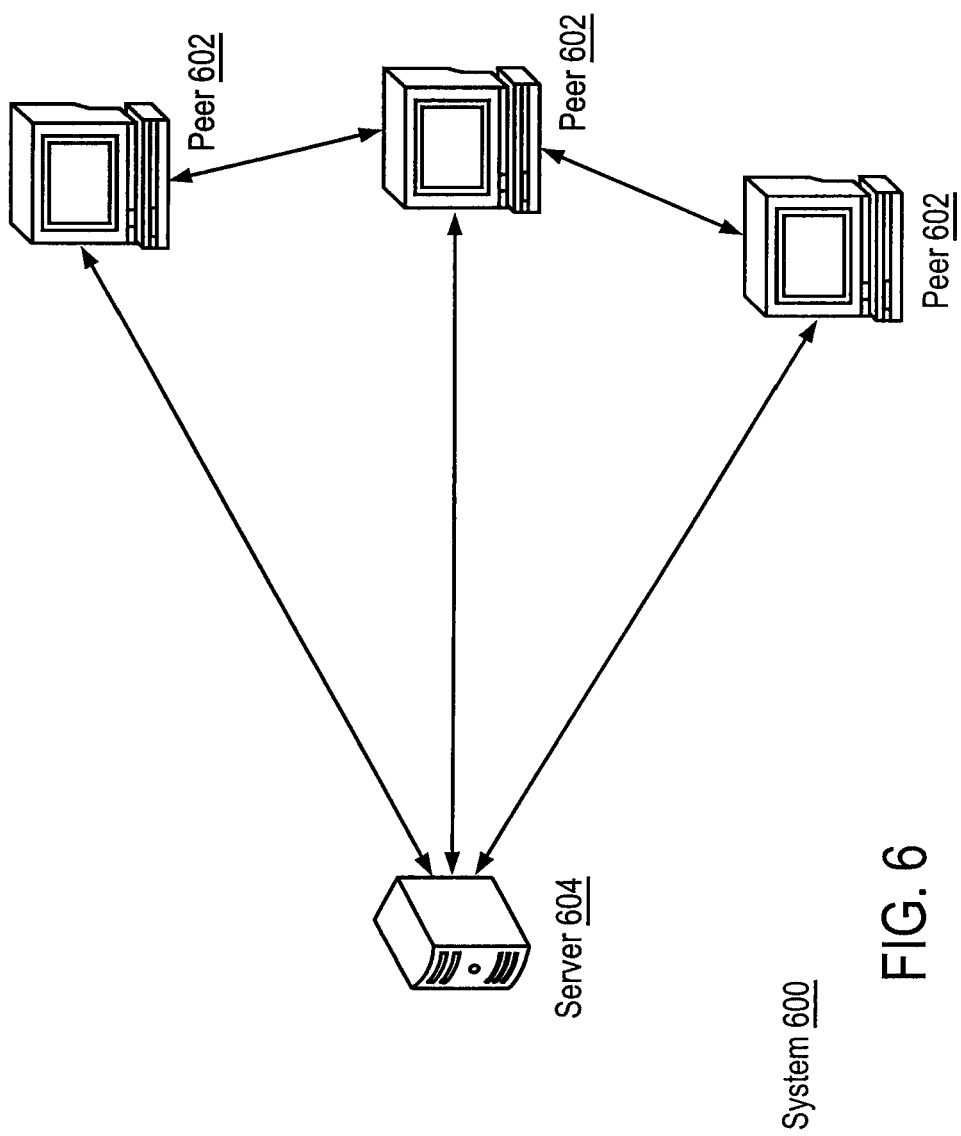
FIG. 6 illustrates interaction between peers and a server in accordance with an embodiment of the present invention.

FIG. 6 provides a high level view of the interaction between peers and a server in accordance with an embodiment of the present invention. Initially, peers 602 communicate with each other and with server 604. As each peer obtains more and more pieces, however, it is more likely that each peer will have access from the peer-to-peer network to the next pieces in the stream to be played, and therefore the peers will not have to obtain those pieces from the server 604. Accordingly, over time, downloads from the server 604 to a particular peer decrease, or even end, as described further below. Of course, although only three peers and one server are illustrated for ease of explanation, many such servers and peers exist in reality.

Server 604 and peers 602 execute server and client software, respectively, that implement the features described herein. Accordingly, each of a peer, a server, or the combination of multiple peers and multiple servers can all be described as a system in the context of the present invention. Thus, we refer to system 600 throughout this specification as an inclusive description of both peers and servers working together where required, and independently as appropriate.

The present invention includes mechanisms for combining the traditional-server client model with a peer-to-peer network protocol. For purposes of this disclosure, we assume that the peer-to-peer protocol being used is the BitTorrent protocol, but it is not intended to limit the applicability of the described invention to BitTorrent.

These mechanisms enable content providers to stream video, audio, or other streaming content to Internet-scale audiences with only a handful of servers with the same user experience expected from the traditional server-client model that today employs vast media server farms to reach large audiences.

System 600 operates in part on the premise that to make a BitTorrent file playable before it has been completely downloaded, it need only ensure that the pieces currently being played have been downloaded. To enable this, system 600 includes servers to provide peers with pieces that they have not obtained in time from BitTorrent peers and, after some startup time, we shift the peers entirely over to the peer-to-peer network. We refer to using a server to fill in missing pieces as hole-filling.

With the described mechanisms the average number of servers required based on a fluid-model is O(1) regardless of audience size. Once there are a large number of peers, if there are even a small percentage of users willing to act as seeds then O(1) of these O(n) seeds may be tasked by system 600 to act as servers without adversely affecting the health of the BitTorrent peer-to-peer network. Once this stage is reached, system 600 can withdraw, leaving a self-sustaining, infrastructure-less peer-to-peer streaming system now having traditional server-client streaming performance. This process can be referred to as "kindling", inspired by the Chinese saying "Xing Xing Zhi Huo, Ke Ii Liao Yuan," meaning "little chips light vast fires."

In describing the present invention, we first describe a set of extensions to the BitTorrent ASsisted Streaming (BASS) system to improve performance and to deal with uncooperative peers. We refer to this first set of mechanisms as BASS Extensions. We then describe Kindling, which reworks BASS to achieve O(1) servers to serve n concurrent streams. We first develop BASS Extensions because Kindling degrades to BASS when n is small.

The BASS Extensions enabled in accordance with an embodiment of the present invention include:
    bandwidth sharing mechanisms to adequately allocate bandwidth to hole-filling servers;
        an auction method for admitting the best file sharers; and
        several ways of estimating imposed load on the server for purposes of bid estimation.
    Kindling retains BASS's hole-filling behavior and enables the following:

Kindling offers an alternative to the auction in the form of an admission control mechanism;
Kindling changes the incentive mechanism used to shift load away from the hole-filling servers and on to the peer-to-peer network; and
Kindling employs a sliding window to schedule pieces that it downloads from windows.
BASS Extensions
The first extension to BASS that system 600 provides is the use of receiver-driven bandwidth sharing. Second is the use of auctions to provide incentives to end users to switch over from the server to the BitTorrent P2P network. Running an auction requires some means of computing bids, and system 600 therefore includes bid estimators.
Receiver-Driven Bandwidth Sharing and Congestion Control
System 600 enables streaming video and TCP to perform well together in the same access bottleneck. The problem is that the TCP/IP protocol stack has no built-in notion of Quality of Service (QoS). Mehra and Zakhor devised mechanisms for Receiver-Driven Bandwidth Sharing (RDBS) for TCP alone and for TCP plus video. System 600 combines a partial video stream arriving from a BASS hole-filling server and BitTorrent TCP connections consuming as much of the remaining capacity as possible.

In one embodiment receiver-driven bandwidth sharing is implemented using TCP rate control. TCP rate control adjusts the TCP send rate by manipulating the receiver's advertised window, $$\text{rate} = \frac{\text{window}}{rtt}.$$

In another embodiment, receiver-driven bandwidth sharing is implemented by limiting the rate bytes are read from the TCP receive buffer. If we read from the buffer at rate r, then the sender cannot exceed rate r once the TCP receive buffer is full.

Thus, by manipulating window sizes or buffer read rates, capacity can be reallocated as desired, including providing higher priority bandwidth access to BASS's hole-filling.

If video is delivered using TCP, e.g., to avoid a firewall, then BitTorrent connections can interfere with the video stream. TCP allocates capacity roughly fairly. However, when there are many TCP connections or little capacity in excess of the stream's encoded bit rate, a fair share may be insufficient to get the next piece from the hole-filling BASS server to the video coder. Assuming a fair share is sufficient, another problem exists as the video progresses: because fewer and fewer holes need to be filled by the server, the server is frequently starting with a small window size. As is known by those of skill in the art, TCP exhibits a bias against TCP connections with small windows. With RDBS, the capacity allocated to lower priority BitTorrent connections can be quickly scaled back to permit a slow-starting server sufficient share to deliver the next piece before the playback deadline.

If video is delivered using UDP without TFRC or similar congestion control, then the video will push aside BitTorrent connections. However, both TCP and UDP will experience bursts of packet loss due to TCP's loss-based congestion control mechanisms and burst loss will cause video quality to suffer. System 600 therefore uses TCP rate control, which enables throttling of the TCP connections before they incur loss.

In one embodiment, rates are computed using the ERICA rate control algorithm devised by Shivkumar Kalyanaraman et al. ERICA was originally envisioned for use in ATM networks and thus classifies traffic as either Variable Bit Rate (VBR) or Available Bit Rate (ABR) traffic. VBR traffic is assumed to be inelastic to congestion and is thus given high priority over presumably elastic ABR traffic. As far as the ERICA rate computation is concerned, hole-filling from a BASS server is treated as VBR traffic and all TCP connections are treated as ABR traffic.

ERICA computes a max-min fair allocation of any capacity not used by VBR traffic. System 600 places a bound on the VBR traffic that is more than sufficient to fill a hole before the missing piece is needed. As a result, the bit rate oscillates whenever hole-filling occurs. However, RDBS also allows TCP connections to quickly recover to a max-min fair share. The amount of time depends somewhat on the TCP implementation. With TCP Rate Contorl, the TCP implementation in ns-2 does not reduce TCP's cwnd or ssthresh variables whenever the receiver advertised window is below cwnd. As a result, TCP jumps straight back to the desired rate when the receiver advertised window is lifted. More conservative TCP implementations may slow-start back to their respective pre-hole-filling congestion windows.

Note that receiver-driven bandwidth sharing cannot achieve the equivalent of priority queuing at a remote bottleneck such as at the access point, but it can keep queue lengths controlled by using Vegas-like mechanisms to estimate queuing delay, or increasing receiver advertised window sizes until such increases no longer result in an increase in throughput.

We have implemented TCP Rate Control, but we assume that access capacity is known. Users have traditionally provided an upper bound on the capacity that can be allocated to peer-to-peer file sharing programs and thus this does not seem unreasonable that this same configuration parameter could be applied both to BASS hole-filling traffic and to BitTorrent traffic. Even without a user-provided rate limit, Mehra's system does not explicitly estimate access capacity. Thus access capacity estimation is not necessary for hole-filling.

Receiver-Driven Bandwidth Sharing Versus Static Rate Limits

In another embodiment, an alternative to Receiver-Driven Bandwidth Sharing is to statically rate limit BitTorrent connections sufficiently below access capacity to allow for non-rate limited hole-filling traffic to progress unhindered.

Static rate limits do not allow BitTorrent to use the entire access capacity even when neither hole-filling nor other applications are using the capacity. However, the sheer simplicity of static rate limits may overwhelm the benefits of more sophisticated, complex, and error-prone solutions.

Neither RDBS nor static rate limits completely protect hole-filling against TCP or UDP traffic that is not rate-controlled or rate-limited. We refer to un-rate-controlled or un-rate-limited TCP or UDP traffic as being unconstrained. Once unconstrained traffic causes the local access point to become saturated, all connections including the statically rate-limited connections begin to build queue. Queuing potentially induces loss that affects the hole-filling as well as all other constrained and unconstrained traffic.

Assume Mehra's rate controller is applied to just the BitTorrent traffic. When unconstrained traffic causes the bottleneck to become saturated, the rate controller constrains BitTorrent. Thus the lower priority BitTorrent traffic becomes a cushion protecting video from unconstrained TCP and UDP. This cushioning effect does not occur with static rate-limited BitTorrent connections.

Auctions to Encourage Well-Behaved Users

What incentive does a user have to switch over from a reliable server to an unreliable peer-to-peer network that will consume the user's upstream access capacity? The answer depends on the user's utility derived from receiving faster than the encoded bit rate. To achieve flawless video playback, the server need only send slightly above the encoded bit rate. If user utility is an increasing function of receive rate then users have incentive to use BitTorrent to receive in excess of the rate obtained from the server. If users derive little utility from receiving in excess of the encoded bit rate, then some additional incentive mechanism is necessary to shift people from the server onto the peer-to-peer network.

System 600 therefore optionally implements the notion of a "game-within-a-game." The BitTorrent peers 602 engage in rate-based tit-for-tat while they also engage in an auction game to gain access to the hole-filling server. The key is to make the best tit-for-tatter the winner of the auction. Each peer 602 wishing to stream computes a bid and submits it to the server 604. The peer that submits the lowest bid wins. To make the auction winner coincide with the best tit-for-tatter, the bid is interpreted as an upper bound on the number of bits the user will download from the server.

As the peer progresses in its BitTorrent download, the peer revises its bid downward to reflect the bits it has received from BitTorrent and the consequently lower estimated load it will impose on the server. As the peer progresses, the number of samples it has from which to model the expected bit rates from BitTorrent also improves and thus its bids can become less conservative.

To prevent or at least discourage cheaters, each bid is treated as a contract. If a peer exceeds the contract, meaning the peer becomes an offender by attempting to download more than the number of bits in its bid, then the server boots the peer, causing the peer to likely experience a disruption in playback until BitTorrent completes the entire download. This is called the strict boot policy. The potential of being booted is considered sufficient deterrent to ensure that most users will attempt to download as much as possible from BitTorrent to avoid this eventuality.

There are a number of not quite so harsh strategies for dealing with peers that exceed their contracts, including the following:

Best-effort Penalty Box: The server 604 moves the offender into a best effort class where the server continues to send to the peer only when the server has unused capacity. The server then gives the offender's rate allocation back to the admission controller to admit new peers. This method will not cause offenders to experience any reduction in quality when the server is underutilized.

Low Priority Penalty Box: Essentially the same as the best-effort penalty box except the peer's capacity is not retracted and returned to the admission controller. Thus only when the server starts to experience a heavy load as would happen when there are large or many offenders does the penalty box start degrading the offender(s)' quality. This is a weaker penalty than best-effort.

Quality Penalty Box: For MPEG video, the server begins dropping offenders' B and P frames to keep load down.

Advertisement Penalty Box: The server refuses to provide any more capacity to the viewer until the viewer downloads (and presumably views) an advertisement. The user is then allocated some additional bits on its contract.

Likewise, users can take progressively more complex steps to avoid exceeding the contract. A user can choose to degrade its own video quality to avoid a more stringent response from the server. For example, the user can choose to download only I frames from the server whenever the user is well above the expected rate from which the user's bid was originally derived.

Admission Control

As peers complete viewing or prematurely stop viewing, the admission controller admits the next low bidder from the auction. That is, system 600 knows that a user makes its heaviest demands of the server 604 at the beginning of the streaming session, so the admission controller only admits the next low bidder if the average available capacity exceeds the encoded bit rate. The system parameters for the admission control algorithm in one embodiment are given in Table I.

TABLE I

SYSTEM PARAMETERS FOR
BASS SERVER ADMISSION CONTROL

| Parameter | Description | Typical Value |
|---|---|---|
| α | EWMA parm for util | 0.1 |
| interval | averaging interval | 15 seconds |
| thresh | utilization threshold | 0.9 |

The admission control algorithm in one embodiment operates as follows:

```
while ( (thresh-stil) – up_cap        >
       encoded_rate && |bids| > 0 )   (1)
{
    util += r0/up_cap;                (2)
    bass_peer = bids.pop( );          (3)
    bass_peer->admit( );              (4)
}
```

Step (1) proceeds to admit peers only while the available uplink capacity exceeds the encoded bit rate. The available uplink capacity is determined to operate the server around a threshold utilization threshold. The thresh system parameter that is provisioned to reduce the likelihood of saturation.

If a peer is not admitted, its bid remains in bids until the necessary capacity becomes available or the bid is not updated for more than 10 minutes in which case the bid is discarded.

In Step (2), util is boosted to immediately take into account the increase in utilization that could be incurred by a flow that starts streaming. The increase in rate is bounded by the encoded bit rate. util is time averaged utilization of the server's access uplink. This step introduces a conservative bias into the utilization estimator to prevent multiple peers from being admitted in rapid succession when the utilization drops.

In Step (3), pop removes the smallest bid from the bids set.

In Step (4), admit tells the peer with the smallest bid that it is now allowed to begin streaming.

At the end of every fixed-length time interval, the server updates its utilization estimate according to an exponentially weighted moving average.

Methods for Bid Estimation

When a peer first joins, it submits a starting bid equal to the length of the file. If the BASS Server 604 is sufficiently underutilized then it will immediately admit the peer despite the high bid. The peer cannot submit any lower bid when it first starts, because the peer has no knowledge of what bit rate it can get from the BitTorrent network.

The current auction implementation uses the trivial remaining file bid estimator. This estimator periodically sets its bid equal to the size of the file minus the number of bits that have been downloaded from BitTorrent. This rewards the best tit-for-tatters prior to admission to streaming, but it places no constraint on how much the admitted peer downloads from the BitTorrent network after admission. A better estimator is needed.

System 600 can model the expected load a peer will place on the server and submit the expected load as that peer's bid.

We use the terminology given in Table II.

TABLE II

BASS NOTATION

| | |
|---|---|
| t | Current time in playback |
| T | Duratin of file when played |
| $R_B(t_1, t_2)$ | Rate of bits to interval $[t_1, t_2]$. |
| $R_B(t)$ | Bitrate arriving from BitTorrent. |
| $R_S(t)$ | Bitrate from server. |
| E(t) | Effective bitrate from BitTorrent = Rate bits are read from storage. |
| B(t) | Benefit derived from BitTorrent = Number of bits played from BitTorrent. |
| R(t) | Combined rate from server and BitTorrent. |
| r | Rate from BitTorrent when p2p network is bottlesecked. |
| $r_0$ | Encoded bitrate. |
| C | Peer's access downlink capacity. |
| $C_{up}$ | Peer's access uplink capacity. |
| $C_S$ | Server's access uplink capacity. |

Figure 7:
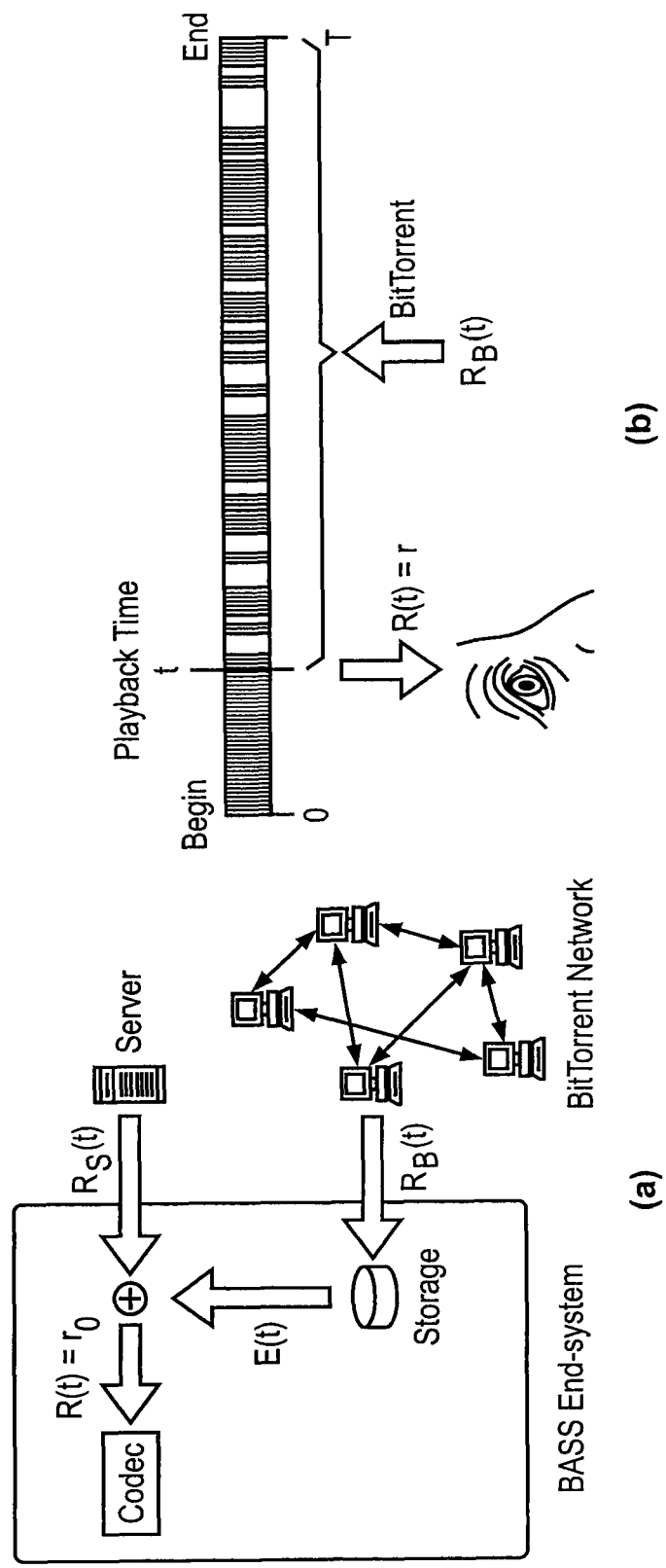
FIG. 7(*a*) illustrates the flow of pieces into a peer in accordance with an embodiment of the present invention.

We analyze BASS using a bufferless, fluid model that ignores piece boundaries. Our analysis views the system from a single peer P as shown in FIG. 7(a). Peer P has sufficient local storage to contain downloaded pieces for the media file, peer P receives from a server with rate $R_S(t)$, and peer P receives from a BitTorrent network with rate $R_B(t)$. Because BitTorrent delivers bits in rarest-first order we have two notions of time (see FIG. 7(b)): there is the current playback time t and the time that an arriving bit will be played τ: At t=0, the user begins viewing the file, and the user finishes at time t=T. We assume the playback time for a bit arriving from BitTorrent is uniformly distributed in the unviewed portion of the file. This means that at any time t, the playback time T for the next received bit obeys τ=U[t,T].

We consider BASS operating in one of two cases. In the first case, the aggregate uplink capacity of the peers is insufficient to saturate the peers' downlinks, or peer P has insufficient uplink capacity to elicit enough reciprocation from other peers to saturate P's downlink.

Case 1: Unsaturated Downlink

In this case, we assume that either remote uplinks are saturated and therefore cannot provide additional bit rate to peer P, or peer P's uplink is saturated. If the prior is true, then the rate at which bits arrive from BitTorrent corresponds to a portion of the uplinks of the constant number of peers connected to P and thus $R_B(t) \propto C_{up}$, where $C_{up}$ is peer uplink capacity. If the latter is true and the BitTorrent network reciprocates roughly at the same rate as the local peer sends, then $R_B(t) \approx C_{up}$. Either way, we simplify the problem by setting $R_B(t)$ equal to constant r.

If we let $R_B(t)$ denote the rate of bits arriving from BitTorrent and $R_B(t_1, t_2)$ denote the rate bits arrive to interval $[t_1, t_2]$ then $$R_B(t) = R_B(t, T) = r.$$

Let B(t) denote the benefit derived from BitTorrent up to time t, meaning the number of bits provided from BitTorrent that have been played. B(t) is thus given by $$B(t) = \int_0^t R_B(\tau, t) d\tau. \quad (1)$$

Because in our analysis the bits arriving from BitTorrent are uniformly distributed across any interval $[t_1, t_2]$ for $t_1 \geq t$, $$R_B(t_1, t_2) = R_B(t)\frac{t_2 - t_1}{T - t}. \qquad (2)$$

Before we can determine the load imposed by peer P on the server, we must first determine the rate peer P can read useful bits from its local storage. This is the effective bit rate E(t), which from Equations (1) and (2) is given by $$E(t) = \frac{d}{dt}\int_{\tau=0}^{\tau=1} R_B(\tau, t)d\tau \qquad (3)$$
$$= \frac{d}{dt}\int_{\tau=0}^{\tau=t} R_B(\tau)\frac{t-\tau}{T-\tau}d\tau,$$

Rewriting to avoid the possibility of an effective bit rate exceeding the encoded bit rate, $$E(t) = \begin{cases} r[\ln T - \ln(T-t)] & \text{if } 0 \le t \le t^* \\ r_0 & \text{if } t^* \le t < T \\ 0 & \text{otherwise} \end{cases}$$

where $t^*=(1-e^{-r_0/r})T$ is the time when the entire media file resides in storage and thus downloading from the server is no longer necessary.

Since the model is bufferless, and the peer only downloads from the server when it cannot obtain the bits from the local storage, the sum of the rate from the server and from local storage is always equal to the encoded bit rate, $$R_S(t) + E(t) + r_0. \qquad (4)$$

thus $$R_S(t) = \begin{cases} r_0 - r[\ln T - \ln(T-t)] & \text{if } 0 \le t < t^* \\ 0 & \text{otherwise,} \end{cases} \qquad (5)$$

Figure 8:
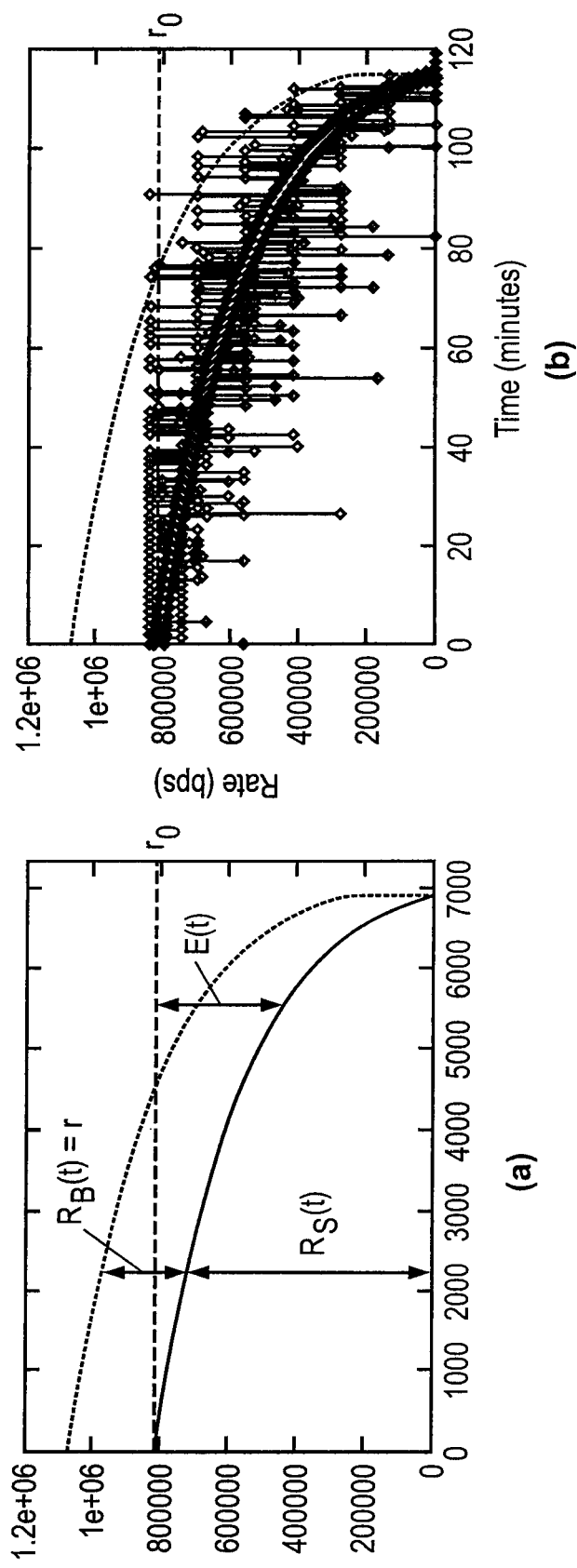
FIG. 8 illustrates a rate at which a peer receives bits from a media server in accordance with an embodiment of the present invention.
Figure 9:
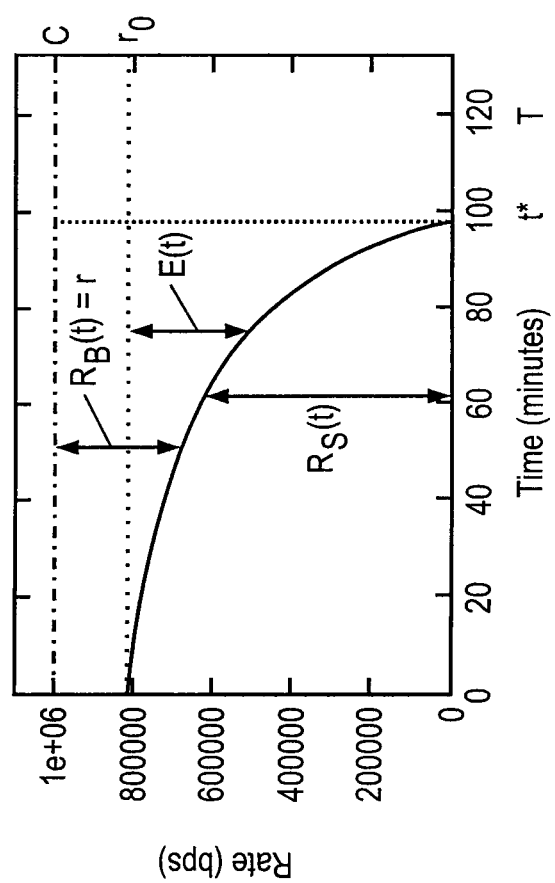
FIG. 9 illustrates the rate a peer receives from a media server and from the BitTorrent network when the downlink is saturated, in accordance with an embodiment of the present invention.

In FIG. 8(a), there is illustrated the relationship between $R_s(t)$, $R_B(t)$ and E(t) versus time. A simulation with one server, one BASS peer, and an underprovisioned BitTorrent network was undertaken, and the results compared against the analysis as shown in FIG. 8(b). which yields expected load imposed by peer P as $$E[R_s(t)] = r_0 - r[1 - e^{-r_0/r}], \qquad (6)$$

As noted, the expected load can be used as a basis for computing a bid.

Case 2: Saturated Downlink

A node can determine when it is in a state with a saturated downlink versus a state when the BitTorrent peer-to-peer network is bottlenecked elsewhere with the following procedure:

---
if util > sat_thresh then
    saturated
else
    not saturated
---

Here sat_thresh is a system parameter in (0, 1) likely close to 0.9. util is measured over an interval and exponentially averaged in the same manner as the util variable maintained by the BASS server.

If a node is in the case of a saturated downlink then it uses the following analysis as input to its load estimate, which it can use as its bid.

In the case of a saturated downlink, $R_B(t)$ is no longer a constant r, but is rather a function of the available capacity. Because of the auction game, we know that a user will want to maximally utilize BitTorrent to avoid the possibility of being cut off before completing streaming. Thus we can restate the problem as a simple single variable linear optimization:

maximize $R_B(t) \forall t \in [0, t^*]$ (7)

such that $R_s(t) + R_B(t) \le C$ (8)

$R_s(t) + E(t) \ge r_0$ (9)

$R_s(t) \ge 0, R_B(t) \ge 0$ (10)

$0 \le E(t) \le r_0$ (11)

The above maximization applies until the file is downloaded at time $t=t^*$ at which time $R_s(t)$ and $R_B(t)$ go to zero.

Assume $R_s(t) + R_B(t) < C$ and $R_B(t)$ is optimal, increasing $R_B(t)$ does not violate any constraints and thus we are met with a contradiction. In order for $R_B(t)$ to be optimal, $R_s(t) + R_B(t) = C$.

Assume $R_B(t)$ is optimal for a case when $R_s(t) + E(t) > r_0$. Decreasing $R_s(t)$ must increase $R_B(t)$ to satisfy the proof in the previous paragraph, and thus we are again met with a contradiction. Thus, $R_s(t) + E(t) = r_0$.

Substituting $R_s(t) = C - R_B(t)$ into Inequality (9) and changing to an equality in accordance with the above proofs yields $$C - R_B(t) + E(t) = r_0. \qquad (12)$$

Combining Inequality (12) with Equation (3) and converting to an equality yields the integral equation $$C - R_B(t) + \frac{d}{dt}\int_{\tau=0}^{\tau=t} R_B(\tau)\frac{t-\tau}{T-\tau}d\tau = r_0. \qquad (13)$$

Equation (13) simplifies to $$C - R_B(t) + \int_{\tau=0}^{\tau=t} R_B(\tau)\frac{1}{T-\tau}d\tau = r_0. \qquad (14)$$

Differentiating Equation (14) yields a first-order non-linear homogeneous differential equation $$-\frac{d}{dt}R_B(t) + R_B(t)\frac{1}{T-t} = 0,$$

which yields $$R_B(t) = \frac{A}{t-T}$$

where A is an arbitrary constant. Substituting back into Equation (14) and evaluating at 0 to solve for the constant A yields, $$R_B(t) = \begin{cases} \frac{(C-r_0)T}{T-t} & \text{if } t \leq t^* \\ 0 & \text{otherwise} \end{cases}$$

where $t^*=C$ and corresponds to the time when the file has been completely downloaded. Because $R_s(t)=C-R_B(t)$ while the file is incomplete, $$R_S(t) = \begin{cases} C - \frac{(C-r_0)T}{T-t} & \text{if } t \leq t^* \\ 0 & \text{otherwise} \end{cases}$$

$R_s(t)$ and $R_B(t)$ are shown in FIG. J.

To determine the expected load imposed by this peer we integrate across the length of the file yielding $$E[R_S(t)] = \frac{1}{T} \int_{\tau=0}^{\tau^*} C - \frac{(C-r_0)T}{T-\tau} d\tau. \tag{15}$$

The expected load can serve as a basis for computing a bid.

Kindling

Kindling proceeds from the observation that for the game theoretic underpinnings of the rate-based tit-for-tat to work, there need only be more than about 5 peers in the game who have overlapping interests to serve as a basis for trade. The number 5 comes from 4 unchoked peers, 1 optimistic peer, and at least 1 other fighting to get into the top 5. For the game to function well however, more than 5- perhaps 10-peers would be desirable. Regardless of the exact number, the number is 0 (1) and we denote this constant k.

In the context of streaming media, Kindling prefers that the P2P network provide pieces that are needed in the near future, because if peers reach a stage during playback where their neighboring peers can always plug holes before the hole-filling server is forced into it, then the hole-filling server is freed up to focus on starting peers.

To completely eliminate a peer's reliance on hole-filling after some time into playback requires 1) that peers are grouped based on when they started streaming or more accurately based on their current playback times, and 2) peers focus on downloading pieces of overlapping interest, i.e., pieces within a time range that encompasses all peers in a group.

We ignore for a moment the possibility that this could skew the distribution of pieces within the network. What is more important is that tit-for-tat works well. Pieces might disappear from the peer-to-peer network using this strategy, but they will always be available from the hole-filling servers.

Unfortunately, when the number of users is small there are likely to be few viewing the nearby portions of the media file. If the users arrive according to a Poisson process then users' current playback times will be uniformly distributed across the entire length of the file. In order to serve as a basis of trade, each user would then need a broad scope to encompass pieces of common interest. In other words, each peer would have to download pieces across the entire length of the file. Because each user already has pieces he or she has viewed, this means downloading pieces across the unviewed portion of the file. This is exactly what BASS does.

For small n, Kindling is BASS.

As n increases, peers become closer to each other on the timeline. Unfortunately with existing BitTorrent, tracker returns a random subset of the peers rather than a subset based on playback times. In one embodiment we modify the tracker and/or the BitTorrent Distributed Hash Table (DHT), and/or Peer Exchange (PEX) to return the k peers with the nearest playback times in addition to the random subset of peers normally returned.

Assume we order the peer's according to current playback times from smallest to largest $(t_1, t_2, \ldots, t_k)$. The local peer's playback time t is guaranteed to be less than $t_1$. We introduce the notion of timewise nearness to refer to peers with near playback times. The set of k returned from the tracker, and/or DHT, and/or PEX are known as the k-timewise nearest set.

The local peer then uses a modified BitTorrent to download in rarest-first order across the range $[t,t_k]$. We also modify BitTorrent so that it biases it's optimistic unchoke algorithm to more frequently select peers within the k over the set of peers obtained from the tracker.

More accurately stated, every peer has a different k-timewise nearest set and Kindling depends on this. Peers with greater playback times have overlapping interests with those further along in the file and this allows pieces later in the file to propagate pieces back to peers near the beginning of the file. There is some concern that this introduces a net flow from those further along in the file and that this imbalance sacrifices the tit-for-tat mechanism. This is why peers still spend some time trading with peers that are not necessarily in the k-timewise nearest set. Furthermore once a peer has completely downloaded the bits in the interval $[t, t_k]$ the node broadens its scope to include $[t_k, T]$ thereby allowing excess capacity to fight the net flow.

The Intuition of the 0(1) Argument

We have noted that Kindling requires 0(1) servers. We motivate this with a fluid model with the caveat that the model says nothing about Kindling at a scale where TCP mechanisms or the discrete nature of BitTorrent are likely to become significant factors.

We provide the argument below, but let us first provide the intuition behind the argument. If new peers wishing to stream arrive according to a Poisson process then their playback times are uniformly distributed across the length of the file. Let $\Delta t$ denote the length of the interval $[t, t_k]$. Thus the expected value for $\Delta t$ is $$E[\Delta t] = \frac{kT}{n}. \tag{26}$$

As n increases, this interval shrinks. If we only admit peers to stream that can startup within this interval then the expected load imposed on the hole-filling server by a peer is simply $$E[\text{load per peer}] = \frac{1}{T} E[\Delta t] E[\text{startup rate from server}] \tag{27}$$
$$= \frac{1}{T} \frac{kT}{n} E[\text{startup rate from server}]$$

The load imposed by n peers is thus $$E[\text{total load}] = nE[\text{load of peer}] \quad (28)$$
$$= kE[\text{startup rate from server}] \quad (29)$$

Since the "startup rate from server" corresponds to the send rate to a single user during startup, the expected load is $$E[\text{total load}] = O(1).$$

The question remains as to whether the expected "startup rate from the server" is truly independent of n. The following detailed argument suggests that it is.

The O(1) Argument

Consider the case when the downlink is the bottleneck A similar analysis exists for the case when BitTorrent is bottlenecked elsewhere.

As before, for all $t \in [0, t^*]$:

$$R_S(t) + R_B(t) = C, \quad (30)$$

$$R_S(t) + E(t) = r_0, \quad (31)$$

$$R_S(t), R_B(t) \geq 0, \quad (32)$$

and $$B(t) = \int_{\tau=0}^{t} R_B(\tau, t) d\tau.$$

We call $t < \Delta t$, the startup period. At the beginning of the startup period, the system behaves exactly like BASS. A hole-filling server pumps up the peer while the peer engages in rarest-first downloading across the range $[0, \Delta t]$. However, the interval over which pieces are downloaded is a sliding window and thus the behavior of Kindling and BASS soon diverge. The benefit derived from Kindling measured in number of bits played becomes the following.

For all $t < \Delta t$:

$$B(t) = \int_{\tau=0}^{t} R_B(\tau) \frac{t-\tau}{\Delta t} d\tau \quad (33)$$

E(t), the rate bits are read by the codec from the file, becomes $$E(t) = \frac{dB}{dt} = \frac{d}{dt} \int_{\tau=0}^{t} t R_B(\tau) \frac{t-\tau}{\Delta t} d\tau. \quad (34)$$

Substituting Equation (34) into Equation (31) yields $$R_S(t) + \frac{d}{dt} \int_{\tau=0}^{t} R_B(\tau) \frac{t-\tau}{\Delta t} d\tau = r_0. \quad (35)$$

Substituting $C-R_B(t)$ for $R_s(t)$ from Equation (30) into Equation (35) yields $$C - R_B(t) + \frac{d}{dt} \int_{\tau=0}^{t} \frac{t-\tau}{\Delta t} d\tau = r_0,$$

which simplifies to $$C - R_B(t) + \frac{1}{\Delta t} \int_{\tau=0}^{t} R_B(\tau) d\tau = r_0. \quad (36)$$

By differentiating we turn this into a first-order homogenous linear differential equation.

$$-R_B'(t) + \frac{1}{\Delta t} R_B(t) = 0. \quad (37)$$

Solving (37) yields $$R_B(t) = ae^{\frac{t}{\Delta t}}. \quad (38)$$

Where $\alpha$ is an arbitrary constant.

We obtain the initial conditions from the integral equation (36) by evaluating at $t=0$ to get $$R_B(t) = (C - r_0)e^{\frac{t}{\Delta t}} \quad (39)$$

for $t \leq \Delta t$ and $R_B(t) \leq C$.

From Equation 39 we see that BitTorrent ramps up exponentially to take over the bottleneck. Once $R_B(t) = C$, BitTorrent has taken over and the peer no longer needs the server.

The expected load imposed by a peer that ramps up within the startup interval is thus $$E[\text{load per peer}] = E[R_S(t)] \quad (40)$$
$$= \frac{1}{T} \int_{\tau=0}^{t_s} C - (C - r_0)e^{\frac{\tau}{\Delta t}} d\tau$$
$$= \frac{1}{T} \left[ C t_s - (C - r_0) \Delta T \left( e^{\frac{t_s}{\Delta t}} - 1 \right) \right]$$

where $t_s$ is the time it takes before BitTorrent has completely taken over. To solve for the time it takes for BitTorrent to take over we simply solve for $R_s(t_s) = 0 = C - R_B(t_s)$, which yields $$t_s = \Delta t \ln \frac{C}{C - r_0}. \quad (41)$$

Substituting Equation 41 into Equation (40) yields $$E[R_S(t)] = \frac{\Delta t}{T} \left[ C \ln \frac{C}{C - r_0} - r_0 \right]. \quad (42)$$

$$E[\text{total load}] = nE[R_S(t)] = k \left[ C \ln \frac{C}{C - r_0} - r_0 \right]. \quad (43)$$

Since $k$, $C$, and $r_0$ are all constants, $$E[\text{total load}] = O(1). \quad (44)$$

Kindling's Admission Control

In one embodiment Kindling uses admission control to ensure users have sufficient capacity to stream. The admission controller is an optimization that improves the probability of uninterrupted streaming. The admission control can be advisory meaning that the admission controller might only warn the user when uninterrupted streaming is unlikely or impossible.

Kindling does not use an auction.

Instead Kindling's Admission Control admits users when they have enough capacity to startup within the startup period $[0, \Delta t]$ and have enough capacity to eventually sustain streaming without the aid of hole-filling servers. Because all such admitted peers have been submitted to the same requirement, the portion of the P2P network that is streaming is always well-provisioned.

Kindling has a magic number—a threshold above which streaming becomes possible. It is simply the capacity necessary to startup within the startup interval, i.e., $t_s < \Delta t$. Starting from Equation (41), $$t_s = \Delta t \ln \frac{C}{C - r_0}$$

$$\ln \frac{C}{C - r_0} < 1$$

$$C > \frac{e}{e-1} r_0.$$

That is, $$C > 1.58 r_0. \tag{45}$$

As long as a peer's capacity exceeds 1.58 times the encoded bit rate, it can be admitted. Note that there is a twist to this that allows peers to work toward the threshold capacity which we treat below.

So that each peer can send at least as much as it needs to consume, the admission controller require the peer's uplink and downlink capacity both meet this test. Prior to admission, the admission controller requires the peer to run a bandwidth estimator, e.g., as is done by broadbandreports.com, and if the peer meets the test then we queue it for admission.

If a peer cannot be admitted for streaming right away, it can still engage in BitTorrent to download the file. Here is the aforementioned twist, as the peer downloads from BitTorrent the bits are spread evenly across the file. As far as Kindling is concerned, this is effectively the same as reducing the encoded bit rate, since only the non-downloaded part of the file must be streamed. If a peer downloads half of the file, then on average the streaming rate halves and the admission threshold capacity also halves.

Thus any peer can eventually start streaming, although a slower peer may have to wait until it has downloaded almost the entire file.

Kindling and Cheaters

In one embodiment Kindling attempts to identify and punish those that try to download excessively from the server rather than from peers. If a streaming peer continues to download from a hole-filling server after the startup interval plus some amount of time to take into account randomness (perhaps twice the startup interval), the hole-filling server closes the connection to the streaming peer. The streaming peer can continue to try to stream, but it no longer has any access to a server to fill-in holes. The impending deadline to switch entirely over to BitTorrent should be sufficient motivation for peers to work as hard as possible to ramp up the P2P network.

Kindling's Poisson Peer Arrival Process Assumption

Poisson processes arise when users behave independently. The most likely time to find large scale coordination between users is on the release date, when users will likely arrive in a burst that then dwindles to a Poisson process. If all of the peers are near the beginning of the file then there are no peers further into playback that can forward pieces to earlier peers. Nor are there sufficient seeds to make up the difference.

When this occurs, the only way to permit streaming is to introduce infrastructure. A CDN could allocate additional hole-filling servers and peers to jump start the entire peer-to-peer network. However, because Kinding is not effective during this stage, this will require 0(n) infrastructure.

An alternate strategy is to permit users to download the media file before the release date, but the content provider withholds a decryption key. When the release date is reached, the peer-to-peer network is already well deployed with many seeds. Once the small file containing the decryption key is distributed, people who have already downloaded the file can begin viewing.

If the file is encrypted in independent blocks then people with partial downloads can decrypt what they have already downloaded and immediately request admission to start streaming.

BASS, Kindling and Impatient Users

Both BASS and Kindling incur sublinear growth in the number of infrastructure nodes necessary to provide streaming. There is a significant cost-savings argument motivating BitTorrent, BASS, and Kindling. If however a user is willing to pay for the infrastructure, additional infrastructure should be allocated to delivering the content. Assume there are 0(m) users who want to stream a file right now but they have insufficient upstream capacity to contribute to the BitTorrent network to obtain admission. If the CDN has 0(m) underutilized infrastructure, the CDN could always admit the user for the corresponding price.

Preemption let t=current playback time.

let T=duration of file.

As the playback deadline for a piece approaches, when the time gets close enough that the likelihood of downloading in time from the server reaches a safe bound then the local peer preempts any download from a peer and downloads directly from the server.

In one embodiment, the time needed to download a piece is the estimated time to download all non-downloaded pieces from the current playback point to the piece in question plus k*sigma, where sigma is the directly-measured standard deviation in piece download times.

Safe download time is upper bounded to handle the case when the encoded bit rate exceeds the rate received from the server; otherwise, the safe download time diverges resulting in all pieces being requested from the server.

In one embodiment, the request to the remote peer is not cancelled until the requested piece arrives from the server. For a given value of k, this slightly increases the probability that the piece will complete download by the time it is needed with the potential overhead of downloading pieces more than one time.

Eligible Set Computation

When a local peer A decides what piece to download from remote peer B, it rules out pieces that would not likely arrive before they would be preempted.

The algorithm adds remote peer B's safe time to the server safe time to determine the minimum piece that is eligible for downloading from peer B.

B's safe time is determined in the same manner as the server's safe time. All pieces with deadlines beyond the server +B's safe times are considered eligible, and all such pieces form the eligible set.

Priority Window

Figure 10:
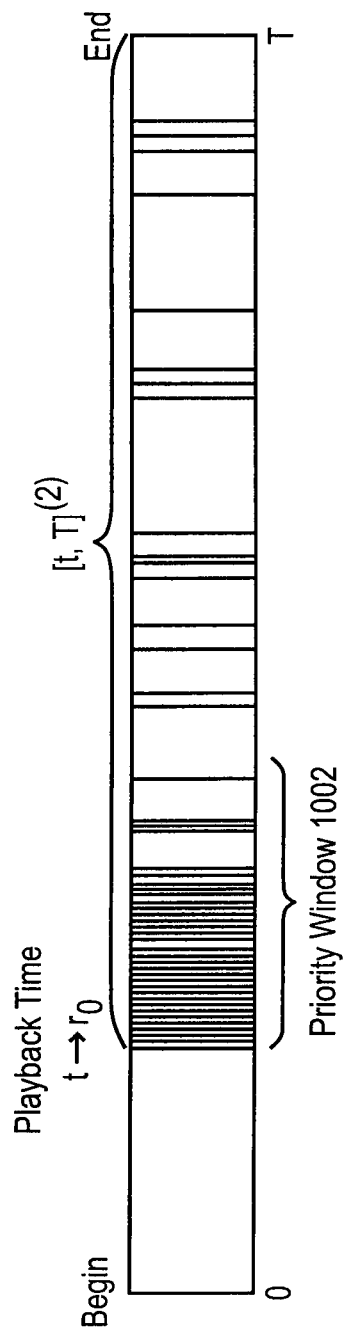
FIG. 10 is illustrates a priority window having a width of a fixed number of pieces in accordance with an embodiment of the present invention.

Referring to FIG. 10, a priority window 1002 having a width of a fixed number of pieces moves in front of the playback point (t). This window is sized to be larger than the maximum bound on "safe time" (the conservative estimate safe download time described above).

When a local peer decides what piece to download from a remote peer, the local peer picks the earliest eligible piece the remote peer has within the priority window that the local peer does not have. A piece is eligible if it is likely to be transferred from the remote peer before it exceeds its safe time, at which point it would be preempted and downloaded from the server. If the remote peer does not have a piece within the priority window, the local peer downloads the rarest eligible piece within the range [t,T] that the remote peer has, and that the local peer does not have.

Use of a priority window has the potential to cause pieces near the beginning of the file to become more prevalent in the swarm than pieces near the end of the file, resulting in under-utilization of the peer network. Consider the case when two peers have the first half of the file but none of the second half. Both need pieces, yet neither has anything the other wants. And, consequently, everything is downloaded from the server.

Priority Window with In-order Rate Adaptation

To improve utilization of the peer network, in one embodiment an adaptive rate controller is introduced, which seeks to saturate each peer's uplink capacity.

The approach is to periodically modify the rate at which pieces are downloaded from the priority window (earliest-eligible first), increasing this rate if the uplink is saturated and deceasing it if the uplink is underutilized.

The adaptive rate controller adjusts how pieces are picked for download and does not control the aggregate rate that bytes are transferred on any timescale relevant to the congestion controller, which operates separately.

As an example implementation of this controller, each peer could maintain a token bucket rate limiting the earliest-eligible download rate. Each time a local peer picks a piece to download from a remote peer, if the token bucket is nonempty, the local peer picks the earliest eligible piece from the priority window that the local peer does not have and has not requested, and that the remote peer has; when such earliest-eligible pieces are downloaded, the token bucket is debited appropriately. If the remote peer does not have a piece in the priority window that the local peer can use or if the token bucket is empty then the local peer picks a piece in rarest first order among the eligible set.

Example Pseudocode:

```
let x = earliest-eligible download rate
let r = total download rate.
let r_0 = encoding rate
let r_up = uplink rate
let c_up = uplink capacity
let c_down = downlink capacity
let rfs = rarest-first rate from server.
let epsilon >= 1
let alpha, beta and gamma be in [0,1]. They are
present to prevent overcontrol.
    Every interval run:
        if r_up < alpha * c_up:                    (1)
            x -= beta * (c_up - r_up)              (2)
        else:
            x += gamma * c_up                      (3)
        excess = max( c_down - r_0, 0)             (4)
        x = max( x, -excess )                      (5)
        x = min(x, r0 * epsilon)                   (6)
        if x < 0:                                  (7)
            rfs = -x                               (8)
        else
            rfs = 0                                (9)
    On every token_interval:
        token_bucket += max(0, x) *
            token_interval                         (10)
        token_bucket = min(token_bucket,
            max_token)                             (11)
    To pick a piece from remote peer B:
    if token_bucket > 0 &&
            (B has pieces in the eligible set):    (12)
        token_bucket--                             (13)
        return earliest eligible piece             (14)
    else:
        return rarest piece in eligible set        (15)
```

Looking at lines (1)-(15) of the pseudocode above:

(1)-(2) If uploading is at less than capacity, decrease the earliest-eligible download rate.

(3) Else, increase the earliest-eligible download rate.

(4) Determine how much headroom there is for downloading from the server in rarest-first order.

(5) Do not let downloading in rarest-first order interfere with downloading at the encoded bit rate from the server.

(6) Upper bound x because there is usually no purpose in downloading much faster than the encoded bit rate in earliest-eligible order when downloading in rarest first order is less likely to have future ill effect.

(7)-(9) Negative values for x denote need to download from the server in rarest first, because downloading rarest first from the swarm was not enough to saturate the local uplink.

(10)-(11) Add tokens to the bucket at rate x, not exceeding the bucket depth (max_token).

(12)-(15) if the token bucket is nonempty, the local peer picks the earliest eligible piece from the priority window that the local peer does not have and has not requested and that the remote peer has; when such earliest-eligible pieces are downloaded, the token bucket is debited appropriately. If the remote peer does not have a piece in the priority window that the local peer can use or if the token bucket is empty then the local peer picks a piece in rarest first order among the eligible set.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for viewing streamed content over a network, the method comprising:

receiving, by a receiving peer via a first connection, a first portion of a content stream from a transmitting peer in a peer-to-peer network, the first portion including less than the entire content stream, a first priority level assigned to the first connection based on the first connection being a peer-to-peer type connection;

playing, by the receiving peer, the received first portion of the content stream;

computing, by the receiving peer, a bid representing a maximum number of bits to be received by the receiving peer from a server included in the network;

submitting, by the receiving peer, the bid to the server;

responsive to the bid, obtaining, by the receiving peer via a second connection, a second portion of the content stream from the server, a second priority level assigned to the second connection based on the second connection being a server-to-peer type connection;

granting, by the receiving peer, the second connection assigned the second priority level a higher priority to bandwidth access than is granted to the first connection assigned the first priority level; and playing, by the receiving peer, the obtained second portion of the content stream.

2. The method of claim h wherein the second portion of the content stream is obtained from the server responsive to a determination while the first portion is being received that the first portion will not include the second portion.

3. The method of claim 1, wherein granting the second connection assigned the second priority level a higher priority to bandwidth access than is granted to the first connection assigned the first priority level comprises:

decreasing in size a receive window associated with the first connection.

4. The method of claim 1, wherein granting the second connection assigned the second priority level a higher priority to bandwidth access than is granted to the first connection assigned the first priority level comprises:

limiting to a maximum rate a rate at which data received via the first connection is read.

5. The method of claim 1, further comprising:

after obtaining via the second connection the second portion of the content stream from the server, computing a revised bid, the revised bid representing a maximum number of bits to be subsequently received by the receiving peer from the server; and submitting the revised bid to the server.

6. The method of claim 5, wherein computing the revised bid comprises:

determining a first number representing bits associated with the content stream previously received from the peer-to-peer network;

determining a second number representing bits included in the entire content stream; and subtracting the first number from the second number.

7. The method of claim 5, wherein computing the revised bid comprises:

determining whether a downlink associated with the first connection is in an unsaturated condition or a saturated condition;

responsive to a determination that the downlink is in an unsaturated condition, calculating an expected load upon the server as a function of an observed bitrate associated with the first connection;

responsive to a determination that the downlink is in a saturated condition, calculating the expected load upon the server as a function of an available capacity associated with the downlink; and basing the revised bid upon the expected load upon the server.

8. The method of claim 1, further comprising:
responsive to requesting a number of bits from the server in excess of the bid, suffering a penalty that includes one or more of the following: discontinued access to the server, decreased access to the server, and receiving an advertisement from the server.

9. The method of claim 1 wherein the second portion of the content stream is received from the server responsive to the bid being lower than bids received by the server from other peers in the network.

10. A method for receiving streamed content over a network, the stream including a plurality of ordered pieces, the method comprising:
obtaining, by a receiving peer, a first set of pieces of the stream from at least one transmitting peer in a peer-to-peer network via at least a first connection, a first priority level assigned to the first connection based on the first connection being a peer-to-peer type connection;
playing, by the receiving peer, at least a portion of the first set of pieces;
determining, by the receiving peer, that at least one ordered piece of the plurality of ordered pieces of the stream is not included in the first set of pieces;
determining, by the receiving peer, that the at least one ordered piece of the plurality of ordered pieces will not be received from the peer-to-peer network prior to the local playback reaching the at least one ordered piece;
computing, by the receiving peer, a bid representing a maximum number of bits to be received by the receiving peer from a server included in the network;
submitting, by the receiving peer, the bid to the server; and
responsive to the bid, obtaining, by the receiving peer, the at least one ordered piece from the server via a second connection, a second priority level assigned to the second connection based on the second connection being a server-to-peer type connection; and
wherein the second connection assigned the second priority level is granted a higher priority to bandwidth access than is granted to the first connection assigned the first priority level.

11. The method of claim 10, wherein obtaining the first set of pieces of the stream from the at least one transmitting peer comprises:
receiving a list of time-wise neighboring peers in the peer-to-peer network; and
requesting an ordered piece from a time-wise neighboring peer more frequently than requesting an ordered piece from any other peer.

12. The method of claim 11, wherein the list of time-wise neighboring peers comprises a predetermined number of peers also playing the stream and having associated playbacks greater than and nearest to the local playback.

13. The method of claim 11, wherein the list of time-wise neighboring peers comprises a predetermined number of peers that started receiving the stream most recently.

14. The method of claim 11, wherein obtaining the first set of pieces of the stream from the at least one transmitting peer comprises:
calculating a priority interval ahead of the local playback, the priority interval bounded by a first playback point and a second playback point ; and
requesting an earliest ordered piece corresponding to the priority interval from a time-wise neighboring peer.

15. The method of claim 14, wherein obtaining the first set of pieces of the stream from the at least one transmitting peer further comprises:
responsive to the earliest ordered piece being unavailable from the time-wise neighbor peer, requesting the rarest piece available from the time-wise neighboring peer.

16. The method of claim 14, wherein the first playback point is equal to the local playback plus a minimum buffer time.

17. The method of claim 10, wherein obtaining the at least one ordered piece from the server comprises:
calculating an upload bandwidth and a download bandwidth;
submitting the upload bandwidth and the download bandwidth to the server; and
responsive to both the upload bandwidth and the download bandwidth exceeding a threshold, accessing the server.

18. The method of claim 10, wherein determining that the at least one ordered piece of the plurality of ordered pieces will not be received from the peer-to-peer network prior to the local playback reaching the at least one ordered piece comprises:
calculating a preemption time, the preemption time representing the time required to obtain from the peer-to-peer network all ordered pieces remaining between the local playback and a playback point associated with the at least one ordered piece; and
determining based on the preemption time that at least one ordered piece will not be received from the peer-to-peer network prior to the local playback reaching the at least one ordered piece.

19. A computer program product for viewing streamed content over a network, the computer program product stored on a non-transitory computer-readable medium and including program code for causing a processor to execute steps comprising:
receiving, by a receiving peer via a first connection, a first portion of a content stream from a transmitting peer in a peer-to-peer network, the first portion including less than the entire content stream, a first priority level assigned to the first connection based on the first connection being a peer-to-peer type connection;
playing, by the receiving peer, the received first portion of the content stream;
computing, by the receiving peer, a bid representing a maximum number of bits to be received by the receiving peer from a server included in the network;
submitting, by the receiving peer, the bid to the server;
responsive to the bid, obtaining, by the receiving peer via a second connection, a second portion of the content stream from the server, a second priority level assigned to the second connection based on the second connection being a server-to-peer type connection;
granting, by the receiving peer, the second connection assigned the second priority level a higher priority to bandwidth access than is granted to the first connection assigned the first priority level; and
playing, by the receiving peer, the obtained second portion of the content stream.

20. The computer program product of claim 19, wherein the second portion of the content stream is obtained from the server responsive to a determination while the first portion is being received that the first portion will not include the second portion.

21. The computer program product of claim 19, wherein granting the second connection assigned the second priority level a higher priority to bandwidth access than is granted to the first connection assigned the first priority level comprises:
  decreasing in size a receive window associated with the first connection.

22. The computer program product of claim 19, wherein granting the second connection assigned the second priority level a higher priority to bandwidth access than is granted to the first connection assigned the first priority level comprises:
  limiting to a maximum rate a rate at which data received via the first connection is read.

23. The computer program product of claim 19, the program code further causing the processor to execute the steps of:
  after obtaining via the second connection the second portion of the content stream from the server, computing a revised bid, the revised bid representing a maximum number of bits to be subsequently received by the receiving peer from the server; and
  submitting the revised bid to the server.

24. The computer program product of claim 19, the program code further causing the processor to execute the step of: responsive to requesting a number of bits from the server in excess of the bid, suffering a penalty that includes one or more of the following: discontinued access to the server, decreased access to the server, and receiving an advertisement from the server.

25. The computer program product of claim 23, wherein computing the revised bid comprises:
  determining whether a downlink associated with the first connection is in an unsaturated condition or a saturated condition;
  responsive to a determination that the downlink is in an unsaturated condition, calculating an expected load upon the server as a function of an observed bitrate associated with the first connection;
  responsive to a determination that the downlink is in a saturated condition, calculating the expected load upon the server as a function of an available capacity associated with the downlink; and
  basing the revised bid upon the expected load upon the server.

26. The computer program product of claim 19, the program code further causing the processor to execute the step of:
  responsive to requesting a number of bits from the server in excess of the bid, suffering a penalty that includes one or more of the following: discontinued access to the server, decreased access to the server, and receiving an advertisement from the server.

27. A computer program product for receiving streamed content over a network, the stream including a plurality of ordered pieces, the computer program product stored on a non-transitory computer-readable medium and including program code for causing a processor to execute the steps of:
  obtaining, by a receiving peer, a first set of pieces of the stream from at least one transmitting peer in a peer-to-peer network via at least a first connection, a first priority level assigned to the first connection based on the first connection being a peer-to-peer type connection;
  playing, by the receiving peer, at least a portion of the first set of pieces;
  determining, by the receiving peer, that at least one ordered piece of the plurality of ordered pieces of the stream is not included in the first set of pieces;
  determining, by the receiving peer, that the at least one ordered piece of the plurality of ordered pieces will not be received from the peer-to-peer network prior to the local playback reaching the at least one ordered piece;
  computing, by the receiving peer, a bid representing a maximum number of bits to be received by the receiving peer from a server included in the network;
  submitting, by the receiving peer, the bid to the server; and
  responsive to the bid, obtaining, by the receiving peer, the at least one ordered piece from the server via a second connection, a second priority level assigned to the second connection based on the second connection being a server-to-peer type connection; and
  wherein the second connection assigned the second priority level is granted a higher priority to bandwidth access than is granted to the first connection assigned the first priority level.

28. The computer program product of claim 27, wherein obtaining the first set of pieces of the stream from the at least one transmitting peer comprises:
  receiving a list of time-wise neighboring peers in the peer-to-peer network; and
  requesting an ordered piece from a time-wise neighbor peer more frequently than requesting an ordered piece from any other peer.

29. The computer program product of claim 28, wherein the list of time-wise neighboring peers comprises a predetermined number of peers also playing the stream and having associated playbacks greater than and nearest to the local playback.

30. The computer program product of claim 28, wherein the list of time-wise neighboring peers comprises a predetermined number of peers that started receiving the stream most recently.

31. The computer program product of claim 28, wherein obtaining the first set of pieces of the stream from the at least one transmitting peer comprises:
  calculating a priority interval ahead of the local playback, the priority interval bounded by a first playback point and a second playback point ; and
  requesting an earliest ordered piece corresponding to the priority interval from a time-wise neighboring peer.

32. The computer program product of claim 31, wherein obtaining the first set of pieces of the stream from the at least one transmitting peer further comprises:
  responsive to the earliest ordered piece being unavailable from the time-wise neighbor peer, requesting the rarest piece available from the time-wise neighboring peer.

33. The computer program product of claim 31, wherein the first playback point is equal to the local playback plus a minimum buffer time.

34. The computer program product of claim 25, wherein obtaining the at least one ordered piece from the server comprises:
  calculating an upload bandwidth and a download bandwidth;
  submitting the upload bandwidth and the download bandwidth to the server; and
  responsive to both the upload bandwidth and the download bandwidth exceeding a threshold, accessing the server.

35. The computer program product of claim 27, wherein determining that the at least one ordered piece of the plurality of ordered pieces will not be received from the peer-to-peer network prior to the local playback reaching the at least one ordered piece comprises:
  calculating a preemption time, the preemption time representing the time required to obtain from the peer-to-peer network all ordered pieces remaining between the local playback and a playback point associated with the at least one ordered piece; and determining based on the preemption time that at least one ordered piece will not be received from the peer-to-peer network prior to the local playback reaching the at least one ordered piece.

\* \* \* \* \*